United States Patent [19]

Cass et al.

[11] 4,134,937
[45] Jan. 16, 1979

[54] POLYESTER RESIN COMPOSITION

[75] Inventors: Robert A. Cass; John M. Butler, both of Dayton; Edward F. Janzow, Xenia, all of Ohio

[73] Assignee: Monsanto Research Corporation, St. Louis, Mo.

[21] Appl. No.: 816,571

[22] Filed: Jul. 18, 1977

Related U.S. Application Data

[60] Division of Ser. No. 478,657, Jun. 12, 1974, abandoned, which is a continuation of Ser. No. 255,633, May 22, 1972, abandoned.

[51] Int. Cl.$^2$ ............................................. C08L 67/06
[52] U.S. Cl. .................................... 260/862; 250/518; 248/458
[58] Field of Search ....................... 260/862, 863, 865

[56] References Cited

U.S. PATENT DOCUMENTS

| | | | |
|---|---|---|---|
| 2,609,353 | 9/1952 | Rubens et al. | 260/45.4 |
| 3,169,947 | 2/1965 | Stroh et al. | 260/85.5 |
| 3,256,362 | 6/1966 | Craubner et al. | 260/862 |
| 3,267,177 | 8/1966 | Howald et al. | 260/865 |
| 3,397,169 | 8/1968 | Wilkinson | 260/37 |
| 3,538,188 | 11/1970 | Fekete et al. | 260/865 |
| 3,539,479 | 11/1970 | Alberts | 260/22 |

FOREIGN PATENT DOCUMENTS 1198571  7/1970  United Kingdom.

Primary Examiner—Harold D. Anderson
Assistant Examiner—E. A. Nielsen
Attorney, Agent, or Firm—Bruce Stevens

[57] ABSTRACT

A polyester resin composition having improved neutron shielding properties can be made by mixing a condensation product of maleic anhydride, phthalic anhydride and polyethylene glycol dissolved in styrene, with at least a sufficient amount of pelleted polyethylene to substantially increase the neutron shielding properties of said condensation product, and a sufficient amount of curing agent such as benzoyl peroxide and N,N-dimethylaniline to promote the curing of the mixture to a solid product. The polyethylene having a relatively high hydrogen content reduces the energy of the neutrons. A powdered boron compound such as boric acid and/or a lithium compound can be incorporated in the composition in amounts at least sufficient to effect substantial thermal neutron capture. Cadmium can be incorporated into the composition being much more efficient at neutron capture than boron or lithium, but then provision must be made for stopping the capture gamma rays generated.

6 Claims, No Drawings

POLYESTER RESIN COMPOSITION

This is a division of application Ser. No. 478,657, filed June 12, 1974, now abandoned, which is a continuation of application Ser. No. 255,633, filed May 22, 1972, now abandoned.

CROSS-REFERENCE TO RELATED APPLICATION

Copending application Ser. No. 219,498, filed Jan. 20, 1972, describes large void-free polyethylene castings which also provide good neutron shielding.

BACKGROUND OF THE INVENTION

1. Field of the Invention

Synthetic resins made from condensation products of polyhydric alcohols and polycarboxylic acids mixed with other materials to increase neutron shielding properties.

2. Description of the Prior Art

In the August, 1962 issue of Nuclear Engineering, pages 305–308, shielding materials for radiation are discussed including polyethylene and boron compounds. It is also known that polyethylene is one of the most effective plastic neutron shielding materials, if not the most effective. In tests against a commercial polyester resin (AROPOL WEP-41), a laminated hardboard (Benelex 70) and an acrylic resin (Plexiglass C), polyethylene was shown to be appreciably more effective than all in neutron shielding, being about 35 to 40% more effective than the polyester, i.e., about 35 to 40% more thickness of the polyester would be required to do the same neutron shielding job as polyethylene.

The polyester resin compositions of this invention having polyethylene incorporated therein have some significant advantages over polyethylene alone. For making large slabs or large complex shapes of polyethylene alone, large high pressure heated molding presses are necessary; whereas, for the polyester compositions of this invention casting large slabs or large complex shapes no heating and no pressure is required. Furthermore, since the polyester compositions of this invention are cross-linked they will not drip and flow in a fire situation as would polyethylene alone.

Polyethylene is an excellent shield for neutrons due to its high hydrogen content. Fast neutrons are slowed by repeated inelastic collision with hydrogen nuclei. A neutron can give up a significant proportion of its energy in a single collision with hydrogen, whereas collisions with nuclei of higher mass number result in much smaller energy transfer from the neutron to the nucleus. Thus hydrogen (and thereby polyethylene) is very effective in reducing the speed (or energy) of a neutron from its initial value to a value approaching that due to thermal motion.

Fast neutrons have a low probability of capture by a nucleus, the absorption cross-sections for fast neutrons being on the order of 30 microbarns.

Slow or thermal neutrons have a probability of capture which varies widely from isotope to isotope. Examples of the thermal-neutron capture cross-sections (cross-section is a measure of probability) for various isotopes are given below.

| | | | Capture $\gamma$ | |
|---|---|---|---|---|
| $^1$H | 0.33 | barns | 2.23 | Mev |
| $^6$Li | 950 | " | none | |
| $^{10}$B | 3840 | " | 0.478 | Mev |

-continued

| | | | | |
|---|---|---|---|---|
| $^{12}$C | 0.0034 | " | 4.95 | Mev |
| $^{113}$Cd | 20,000 | " | 9.05 | Mev |
| $^{151}$Sm | 15,000 | " | 7.9 | Mev |

From the above, it is evident that a number of isotopes absorb neutrons more strongly than does $^1$H, and would thereby be effective shields against thermal neutrons. Unfortunately, upon capturing (absorbing) a neutron, most nuclei emit a gamma-ray of an energy characteristic to that type of nuclei. The energies of these "capture $\gamma$'s" are also indicated in the above table.

The capture $\gamma$ radiation is in itself a potential hazard to humans. The advantage of adding boron to an essentially hydrogen (polyethylene) shield is that most neutrons will be captured in the boron (probability of capture in boron is 10,000 times that in hydrogen), thereby reducing the energy of the capture gamma ray from the 2.23 Mev characteristic of hydrogen to the 0.5 Mev characteristic of boron-10. The gamma dose rate is thus reduced by a factor of $0.5/2.23 = 1/4\frac{1}{2}$.

Lithium-6 can be used in place of or in conjunction with boron-10 for thermal-neutron capture, and although the lithium does not have the efficiency for neutron capture that boron does, it does have the advantage of no capture $\gamma$ emission. Cadmium-113 is one of the most efficient of the common metals for thermal neutron capture, however, high energy capture $\gamma$ emission is generated and must be handled.

Only certain isotopes of the elements are effective in radiation shielding, but hydrogen, boron, lithium and cadmium in their natural state have adequate quantities of the desired isotopes, and processing to enrich the amount of desired isotope is not necessary or desirable from an economic viewpoint.

SUMMARY OF THE INVENTION

The neutron shielding compositions of the invention comprise a polyester resin having incorporated therein at least a sufficient amount of polyethylene to substantially increase the neutron shielding properties of said resin. Polyethylene having a relatively high hydrogen content reduces the energy of the neutrons. A boron compound and/or a lithium compound can be incorporated in the composition in an amount at least sufficient to effect substantial thermal neutron capture. Cadmium compounds can be used in place of boron or lithium compounds where provision is made for handling the high energy capture gamma radiation generated since cadmium is much more efficient than boron or lithium for neutron capture. A preferred method for making the neutron shielding compositions of the invention comprises mixing a fluid composition of polyester resin with at least a sufficient amount of polyethylene to substantially increase the neutron shielding properties of the resin and curing the mixture to a solid product; and, the boron and/or lithium compounds or the cadmium compounds, if used, can be mixed in along with the polyethylene before curing.

DESCRIPTION OF THE PREFERRED EMBODIMENTS

Four slabs of polyester resin compositions of the invention were made as follows:

| Batch No. | 1 | 2 | 3 | 4 |
|---|---|---|---|---|
| Polyester (1) | 1000 g. | 1000 g. | 1000 g. | 900 g. |

-continued

| Batch No. | 1 | 2 | 3 | 4 |
|---|---|---|---|---|
| Benzoyl peroxide | 10 g. | 10 g. | 10 g. | 9 g. |
| Boric Acid (2) | 130 g. | 260 g. | 260 g. | 260 g. |
| N,N-Dimethylaniline | 0.2 g. | 0.2 g. | 0.2 g. | 0.2 g. |
| Polyethylene (3) | 1250 g. | 1250 g. | 1350 g. | 1350 g. |

(1) This was a commercial resin, Altek 52-65 marketed by the Alpha Chemical Company, Inc. It is made by reacting in approximately the following proportions: maleic anhydride (1 mole), phthalic anhydride (1 mole), and propylene glycol (2.1 mole) at about 200° C. until the acid value is reduced to about 20 giving a glass, solid material. To this glassy solid material is added styrene monomer in proportions of 7 parts of glassy solid material to 3 parts styrene, and a fluid of syrup consistency results having a viscosity of about 1000 c.p. at room temperature.

(2) The boric acid was added in powdered form.

(3) The polyethylene used was low density polyethylene in pellet form having dimensions of about 3/16" diameter × 3/16" long.

The ingredients of each batch shown above were mixed at room temperature and then poured into 10" × 12" × 1" thick wood molds. Mylar, a polyester film made by duPont, was used to cover both bottom and side surface of the mold to prevent the slabs from sticking to the mold. Alternatively, to the use of the Mylar, an epoxy paint was used to coat the surface of the mold, then an epoxy paint was coated with a heavy duty floor wax to prevent slabs from sticking to molds. The slabs gelled in about 1 hour and were hard enough to handle in about 4 hours. In like manner 4'×8'×2" slabs have been made which like the smaller slabs are free of cracks.

It is clear that castings of any size or shape can be made, depending on the particular neutron shielding job for which they are being designed. The polyethylene pellets retain their identity and are not dissolved in the polyester. The boric acid powder, if used, is suspended, not dissolved in the polyester. The lithium compound, if one is used, depending on the particular lithium compound used, is either dissolved or suspended in the polyester.

Either high or low density polyethylene can be used and also the size of the polyethylene particular is not critical, however, if polyethylene powder is used the mixture may become too viscous for easy handling.

Boron carbide, boric oxide and the like can be used instead of boric acid, and in fact any source of boron can be used as long as undesirable secondary radiation does not result.

Illustrative of useful lithium compounds are: lithium acetate, lithium nitrate, lithium carbonate, lithium stearate, lithium borate, lithium borohydrate and the like; it should be noted that the last two named compounds would serve to incorporate both lithium and boron. For equivalent effectiveness in absorbing thermal neutrons, about 3 times as much (on a molar basis) lithium should be used as boron.

Illustrative of useful cadmium compounds are cadmium nitrate, cadmium oxide and cadmium hydroxide.

Obviously, other polyester resins than the one used can be used since the polyester serves primarily as a binder for the polyethylene and boron compound. "The Development and Use of Polyester Products", page 3, a text by E.N. Doyle, published by McGraw-Hill, says a polyester resin can be made up of one or more dihydric or polyhydric alcohols, one or more saturated dibasic or dicarboxylic acids, and one or more unsaturated dibasic acids. The text goes on to say that of each of the three basic components, there are literally dozens from which to choose, and when combinations of one or more of each are used, there are many thousands of completely different resins possible, each with properties unique within itself, e.g. ethylene glycol, butylene glycol, propanediol, bis-phenol A or the like can be used in place of propylene glycol; fumaric acid, methyl maleic acid, mesaconic acid, itaconic acid and the like can be used in place of maleic anhydride; and, isophthalic acid, terephthalic acid, succinic acid, adipic acid and the like can be used instead of phthalic anhydride.

The styrene monomer serves the purpose of fluidizing the polyester for fabricating and the styrene is polymerized together with and crosslinks the polyester to give a solid product. Other monomers such as methyl methacrylate can be used instead of or in conjunction with sytrene, furthermore, other suitable monomers than these will be obvious to those skilled in the art.

Other promoters than the two named for polymerizing styrene and polyester are well known in the art and can be used instead of the ones used, but normally it is preferred to use promoters that operate at or near room temperature so no heating of the castings is necessary.

The neutron shielding compositions of the invention can be used in conjunction with other shielding materials. For example, the first shielding layer next to a neutron source might be a cadmium-containing composition of the invention, the second layer lead to absorb the capture γ rays emitted by the cadmium, and the outer cleanup layer a boron and/or lithium-containing composition of the invention. Another multilayer neutron shielding system might be a first layer of polyethylene containing composition of the invention to slow down the neutrons, a cadmium layer to capture thermal neutrons, a lead layer to adsorb capture γ's, and the outer cleanup layer a boron and/or lithium-containing composition of the invention.

Although the invention has been described in terms of specified embodiments which are set forth in considerable detail it should be understood that this is by way of illustration only and that the invention is not necessarily limited thereto since alternative embodiments and operating techniques will become apparent to those skilled in the art in view of the disclosure. For example, lithium or a lithium compound and/or boron or a boron compound could be encapsulated or effectively separated from the polyester by dissolving or suspending in the polyethylene. Also rare earth elements such as europiun and gadolinium can be used in place of cadmium for neutron capture in instances where high efficiency is needed such as where there is limited space for shielding materials and where the high price of these shielding materials can be tolerated. Accordingly modifications are contemplated which can be made without departing from the spirit of the described invention.

What I claim is:

1. A neutron shielding composition comprising an unsaturated polyester resin having incorporated therein at least a sufficient amount of polyethylene to substantially increase the neutron shielding properties of said resin and at least a sufficient amount of a boron compound and/or a lithium compound to further increase neutron shielding properties.

2. A neutron shielding composition comprising an unsaturated polyester resin having incorporated therein at least a sufficient amount of polyethylene to substantially increase the neutron shielding properties of said resin and at least a sufficient amount of a cadmium compound to further increase the neutron shielding properties.

3. A process for making a neutron shielding composition comprising mixing a fluid composition of an unsaturated polyester resin with at least a sufficient amount of polyethylene to substantially increase the neutron shielding properties of said resin and at least a sufficient amount of a boron compound and/or a lithium compound to further increase neutron shielding properties, and curing said mixture to a solid product.

4. A process for making a neutron shielding composition comprising mixing a fluid composition of an unsaturated polyester resin with at least a sufficient amount of polyethylene to substantially increase the neutron shielding properties of said resin and at least a sufficient amount of a cadmium compound to further increase neutron shielding properties, and curing said mixture to a solid product.

5. A process of claim 3 wherein said polyethylene in the form of large particles or pellets rather than powder is mixed with said resin and said boron compound in powder form is mixed with said resin.

6. A process of claim 5 wherein the boron compound is boric acid.

* * * * *